United States Patent [19]

Lister et al.

[11] Patent Number: 4,786,412

[45] Date of Patent: Nov. 22, 1988

[54] HYDROCYCLONE HAVING DEWATERING TUBE

[75] Inventors: Roy D. Lister, Keller; Tommy J. Derrington, Denton, both of Tex.

[73] Assignee: Eagle-Picher Industries, Inc., Cinncincinnati, Ohio

[21] Appl. No.: 124,263

[22] Filed: Nov. 23, 1987

[51] Int. Cl.[4] .......... B01D 17/038

[52] U.S. Cl. .......... 210/512.1; 209/144; 209/211

[58] Field of Search .......... 210/512.1; 209/144, 209/211

[56] References Cited

U.S. PATENT DOCUMENTS 3,288,300 11/1966 Bouchillon .
3,901,799 8/1975 Adkison .......... 209/144
4,067,814 1/1978 Surakka et al. .
4,140,632 2/1979 Boivin .
4,237,006 12/1980 Colman et al. .
4,251,368 2/1981 Colman et al. .
4,309,283 1/1982 Vikio et al. .
4,337,068 6/1982 MacLean et al. .
4,344,783 8/1982 Heinemann et al. .
4,358,369 11/1982 Matula et al. .

*Primary Examiner*—Frank Sever
*Attorney, Agent, or Firm*—Wood, Herron & Evans

[57] ABSTRACT

A hydrocyclone has a lower conical separating chamber with a lower outlet and a tube in the outlet projecting into the concial chamber to reduce the water content of the materials discharged from the lower outlet.

3 Claims, 1 Drawing Sheet

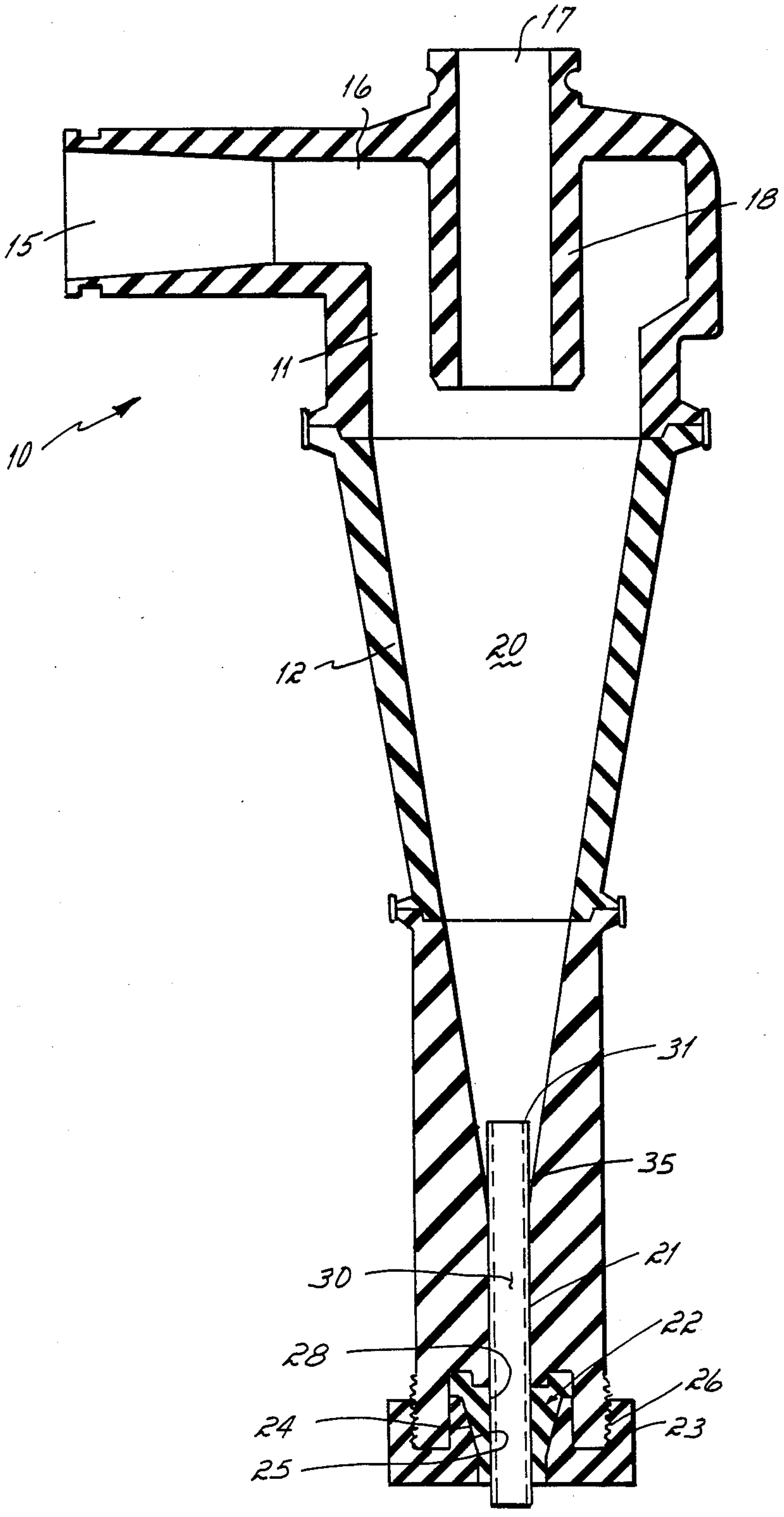
17
16
18
15
11
10
20
12
31
35
21
30
22
28
26
24
23
25

HYDROCYCLONE HAVING DEWATERING TUBE

BACKGROUND OF THE INVENTION

This invention relates to hydrocyclones.

A hydrocyclone is a device that receives a slurry of liquid and solids and separates liquid from the solids. The hydrocyclone has a feed section which has a horizontal inlet to introduce the slurry tangentially under pressure and has an upper opening to discharge water. The hydrocyclone has a lower separating section which includes a conical chamber that terminates in an outlet through which the solids and some entraining water are discharged.

The tangentially-introduced slurry creates a vortex in the center of the feed section with centrifugal force driving the solids radially outwardly. A tube depending slightly from the tangential feed opening is a vortex finder through which water, largely separated from the solids, rises and flows out the upper section. The solids are forced downwardly through an outlet in the lower conical chamber.

The hydrocyclone manufactured by the assignee, Eagle-Picher Industries, Inc., has a urethane valve and valve holder in the outlet in the lower section. The valve has a cylindrical opening and by rotating the valve holder the diameter of the cylindrical opening can be varied. When the valve is squeezed down, the percentage of solids flowing through the outlet increases until a "rope flow" is created, the rope flow being a sausage-like stream of solids with the solids being more than fifty percent by weight of the effluent. While squeezing down the outlet through the valve is effective in reducing the water content of the effluent, there is a trade off, namely, that the hydrocyclone plugs or the efficiency goes way down.

BRIEF SUMMARY OF THE INVENTION

The objective of the present invention has been to reduce the amount of liquid exiting from the hydrocyclone under flow without the disadvantage of plugging and reducing the efficiency.

This objective of the invention is attained by inserting a dewatering tube into the outlet, the dewatering tube projecting well into the conical chamber of the lower section.

The hydrocyclone with the dewatering tube significantly improves the percent of solids in the effluent without the plugging associated with closing down the valve. For example, the normal effluent from the outlet may be 70% liquid. Through the use of the invention, the effluent is about 60% solids and 40% water.

The use of the dewatering tube of the invention appears to cause the fines or silty material to flow through the upper outlet of the hydrocyclone to a greater extent than is the case when no dewatering tube is used. In some dewatering operations this would be regarded as a disadvantage, but in the extracting of sand from a slurry in a quarry operation, the silty materials are not desirable in any event and, hence, the invention is ideally suited for that type of operation.

BRIEF DESCRIPTION OF THE DRAWING

The several features of the invention will become more readily apparent from the following detailed description taken in conjunction with the drawing which is a vertical cross-sectional view through a hydrocyclone of the invention.

The invention will be described in connection with a 10" hydrocyclone, the 10" referring to the diameter of the feed section chamber. The hydrocyclone indicated at 10 has an upper feed section 11 and a lower separating section 12. The upper feed section has an inlet port 15 and an involute feed inlet 16. An outlet 17 is in the upper end of the feed section, the outlet having at its lower end a vortex finder 18 which is a tube depending from the outlet into the feed section.

The lower separating section 12 has a conical interior chamber 20. The conical chamber terminates at the lower end in a lower outlet 21. The outlet 21 has a soft urethane apex valve 22 mounted in a valve holder 23. The valve has an external conical surface 24 mating with a conical surface 25 on the valve holder 23. The valve holder is threaded as at 26 onto external threads at the lower end of the separating section. When the valve holder is rotated to cause it to move vertically with respect to the separating section, the mating conical surfaces between the holder and the valve cause the valve to contract. The valve has a cylindrical opening 28 whose diameter is decreased when the valve contracts.

A dewatering tube 30, which is at the heart of the invention, is slidably positioned in the outlet 21 of the separating section. It is gripped by the valve 22 and is held in any selected position by tightening the valve holder against the valve 22. No precise position of the upper end 31 of this dewatering tube has been determined. Rather, it is preferred that the dewatering tube have the capability of vertical adjustment so that optimum efficiency can be obtained by raising or lowering it depending upon feed parameters such as the percentage of solids in the incoming slurry, the gallons per minute of the incoming slurry, the feet of head pressure of the incoming slurry and the like. In one operative position, the dewatering tube extends approximately 3" above the bottom of the conical surface indicated at 35.

In the operation of the invention, the incoming slurry swirls around the vortex finder creating the usual vacuum associated with a cyclone separator. Water and the silty fines flow up the vortex finder 18 and out the upper discharge opening 17. The solids, driven centrifugally to the outer walls of the separating section, move downwardly and flow into the dewatering tube and are discharged out of the bottom of the dewatering tube. The discharging effluent is about 60% liquid and 40% solids, but this ratio will vary considerably with the feed conditions.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. In a hydrocyclone having an upper feed section for introducing a slurry tangentially into said hydrocyclone and having an upper outlet for discharging water, and a lower separating section having a lower downwardly-directed outlet for discharging separated solids and water, the improvement comprising:
   - a dewatering tube spaced below said feed section extending from said lower outlet into the space above said outlet to further reduce the water content of the materials discharged through said tube, sufficient to provide an underflow through said tube that is up to about 60 percent solids.

2. In a hydrocyclone having an upper feed section for introducing a slurry tangentially into said hydrocyclone and having an upper outlet for discharging water, and a lower separating section having a conical chamber terminating in a lower downwardly-directed outlet for discharging separated solids and water, the improvement comprising:

a dewatering tube spaced below said feed section extending from said lower outlet into said conical chamber to further reduce the water content of the materials discharged through said tube, sufficient to provide an underflow through said tube that is up to about 60 percent solids.

3. A hydrocyclone as in claim 2 in which said outlet includes a soft valve and a valve holder threaded onto the lower end of said separating section to form said lower outlet, said valve having a cylindrical opening whose diameter is varied by rotating said valve holder, said tube being gripped by said valve and being slidably adjustable with respect to said conical chamber to determine its optimum separating position.

* * * * *